Nov. 10, 1931.   A. J. MICHELIN   1,830,879
RAILWAY VEHICLE WHEEL FITTED WITH PNEUMATIC TIRES
Filed Nov. 10, 1930
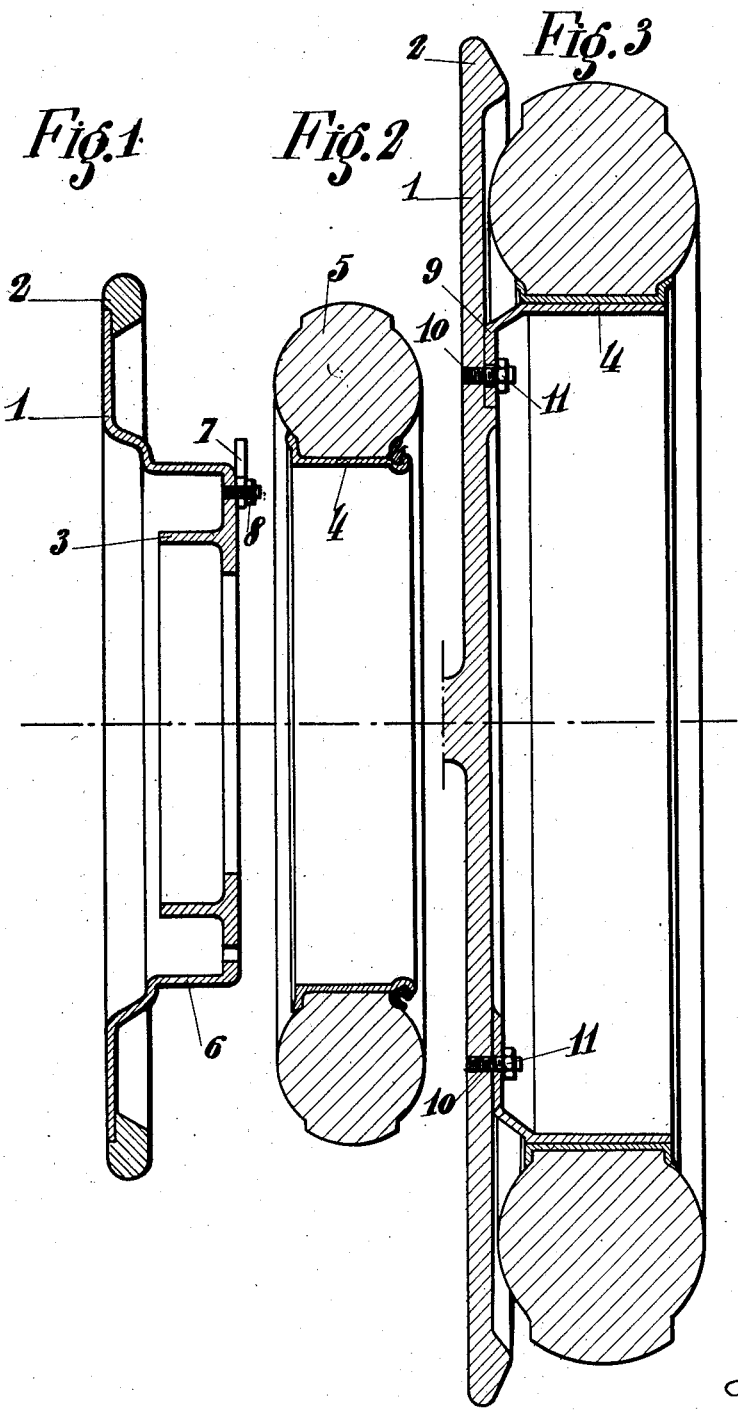

Patented Nov. 10, 1931

1,830,879

REISSUED

UNITED STATES PATENT OFFICE

ANDRÉ JULES MICHELIN, OF PARIS, FRANCE, ASSIGNOR TO MICHELIN ET CIE, OF CLERMONT-FERRAND, FRANCE, A CORPORATION OF FRANCE

RAILWAY VEHICLE WHEEL FITTED WITH PNEUMATIC TIRES

Application filed November 10, 1930, Serial No. 494,771, and in France December 14, 1929.

It is necessary to provide wheels fitted with pneumatic tires and adapted to run on rails with flanges, which are intended to play the same part as the flanges of all railway vehicle wheels. These flanges substantially increase the weight of the wheels, so that a wheel fitted with pneumatic tires for railway vehicles is necessarily much heavier than a wheel fitted with pneumatic tires for road vehicles. Furthermore, it must be said that, railway vehicles being as a rule much heavier than road vehicles, the weight of the wheel for railway vehicles is consequently still more considerable.

If a wheel for railway vehicles is fitted with pneumatic tires, the possibility of the tire getting punctured and the resulting necessity of replacing the punctured tire must be taken into account. If it is necessary, to this effect, to replace the whole wheel, it will be relatively hard work, owing to the considerable weight of said wheel.

My invention has for its object a wheel for railway vehicles that is so arranged that it is not necessary to remove the whole wheel in order to replace the pneumatic tire.

According to my invention the wheel comprises a part fixed to the axle and provided with the guiding flange and, if need be, with a wheel drum.

On the part fitted to the axle is secured another part carrying only the tire and which may be relatively light.

Preferred embodiments of my invention will be described with reference to the appended drawings, given merely by way of example, and in which:

Fig. 1 is a vertical section of the part of the wheel that is secured to the axle.

Fig. 2 is a vertical section of the removable part adapted to carry the pneumatic tire.

Fig. 3 is a vertical section of a different embodiment of my invention showing the two parts assembled together.

The part shown in Fig. 1 comprises a plate 1 on the outer end of which is secured the wheel flange, which may be removable or not. Upon this part may also be fitted a brake drum such as 3. The rim 4, provided with its pneumatic tire (Fig. 2) is adapted to be secured to the part shown in Fig. 1. To this effect, the rim is mounted on a seat 6, and is kept in position by means of a continuous circle or of clamps 7 secured by means of bolts or similar fixation means 8.

In the embodiment shown in Fig. 3, the rim 4 is provided with a flange 9 which may be directly secured to plate 1 by means of bolts 10 passing through holes 11. In this case, the inner wall of rim 4 may be used as a brake drum, and drum 3 may be dispensed with.

While I have, in the above description, endeavored to disclose what I believe to be an efficient and practical embodiment of my invention, it is to be understood that the invention is not limited by the specific details as shown, but that it is subject to many and all structural variations which may express the invention and at the same time come within the scope of the appended claims.

What I claim is:

1. A railway vehicle wheel comprising in combination, a part permanently secured to the vehicle axle, a wheel flange on said part, a rim removably secured to said part, and a pneumatic tire adapted to run on the rail, mounted on said rim, and having an outer diameter substantially smaller than that of the above named wheel flange so that it may coact therewith.

2. A railway vehicle wheel comprising in combination, a part permanently secured to the vehicle axle, a wheel flange integral with said part, a rim, a pneumatic tire mounted on said rim adapted to run on the rail and having an outer diameter substantially smaller than that of said flange so that it may coact therewith, and means on the first mentioned part for fixing said rim thereon, whereby, in the event of a tire getting punctured, only the rim need be replaced.

3. A railway vehicle wheel comprising in combination a part permanently secured to the wheel axle, a wheel flange integral with said part, a cylindrical seat on said part, a rim, a pneumatic tire mounted on said rim adapted to run on the rail and having an outer diameter substantially smaller than that of said flange so that it may cooperate therewith, and means for securing said rim on said cylindrical seat, whereby, in the event of the tire getting punctured, only the rim need be replaced.

4. A railway vehicle wheel comprising in combination a part permanently secured to the wheel axle, a wheel flange integral with said part, a cylindrical seat on said part, a brake drum on said part, a rim, a pneumatic tire mounted on said rim adapted to run on the rail and having a diameter substantially smaller than that of the above named wheel flange so that it may cooperate therewith, and means for securing said rim on said cylindrical seat whereby, in the event of the tire getting punctured, only the rim need be replaced.

5. A railway vehicle wheel comprising in combination a disc permanently secured to the vehicle axle, a wheel flange integral with said disc, a rim, a pneumatic tire mounted on said rim adapted to run on the rail and having a diameter substantially smaller than that of the above named wheel flange, an inwardly extending flange integral with said rim, and means for securing said last mentioned flange to said disc, whereby, in the event of the tire getting punctured, only the rim need be replaced.

In testimony that I claim the foregoing as my invention, I have signed my name.

ANDRÉ JULES MICHELIN.